Oct. 11, 1960   W. HAMILTON   2,955,576
EXHAUST PRESSURE CONTROL SYSTEM
Filed Aug. 13, 1956
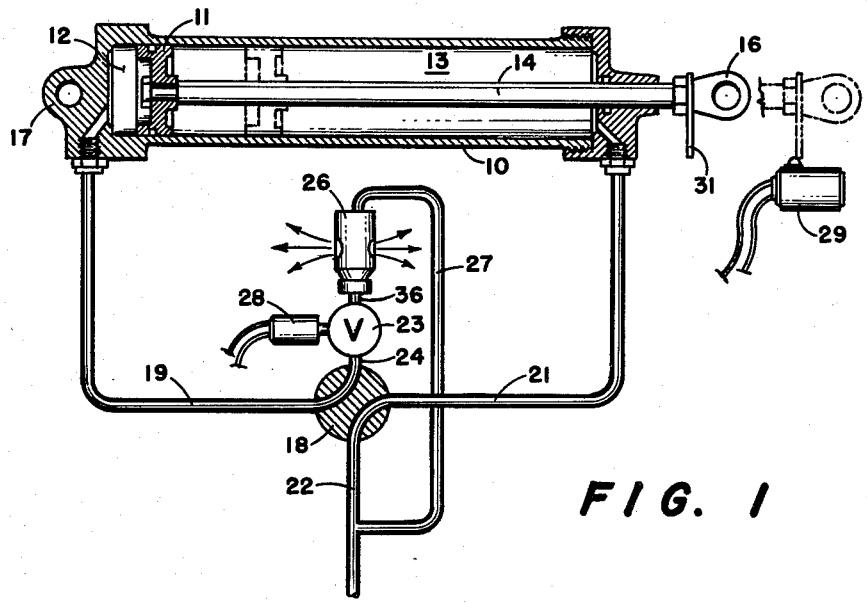
FIG. 1
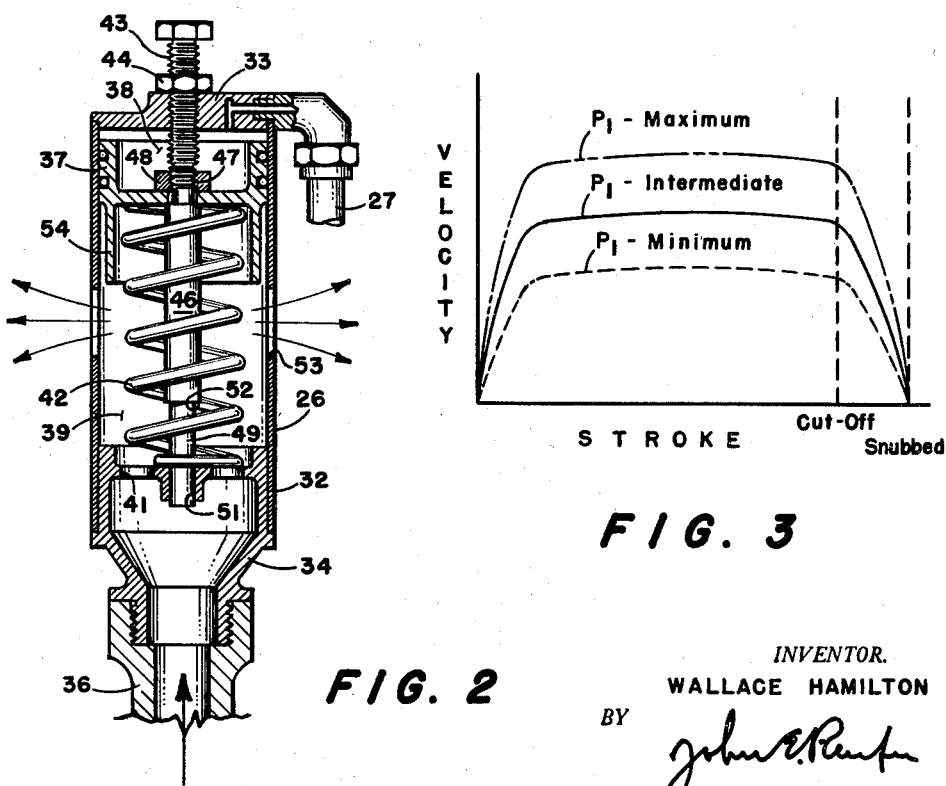
FIG. 2
FIG. 3
INVENTOR.
WALLACE HAMILTON
BY
ATTORNEY United States Patent Office 2,955,576
Patented Oct. 11, 1960.

2,955,576

EXHAUST PRESSURE CONTROL SYSTEM

Wallace Hamilton, Bentleyville, Ohio, assignor to Cleveland Pneumatic Industries, Inc., Cleveland, Ohio, a corporation of Ohio Filed Aug. 13, 1956, Ser. No. 603,537

2 Claims. (Cl. 121—44)

This invention relates to fluid motor control means and more particularly to a control mechanism for use in combination with a positive displacement pneumatic motor which permits the pneumatic snubbing of the motor to bring it to rest at a predetermined point in its stroke.

It is an important object of this invention to provide a control mechanism for use in combination with a positive displacement pneumatic motor which will accurately control the motor to bring it to rest at a predetermined point along its path of movement.

It is another important object of this invention to provide a control mechanism for a pneumatic fluid motor which maintains a predetermined relationship between the inlet pressure and exhaust pressure of the motor.

It is still another important object of this invention to provide a pneumatic motor incorporating means to bring the motor to rest at a predetermined point along its path of movement.

Further objects and advantages will appear from the following description and drawings, wherein:

Figure 1 is a schematic view of a positive displacement fluid motor of the piston and cylinder type in combination with a control mechanism acocrding to this invention.

Figure 2 is an enlarged longitudinal section of the exhaust regulator according to this invention; and Figure 3 is a velocity stroke diagram showing the operation of a positive displacement motor controlled by a regulator according to this invention.

In many installations, positive displacement pneumaitc motors are used to operate a load through a predetermined stroke. If some form of cushioning is not provided to bring the motor to rest, destructive loads will be present when the various elements impact at the end of such stroke. In other installations, it is necessary to slow the motor to a predetermined velocity at a predetermined point in the stroke so that secondary loads may be picked up without undue impact stresses. A control mechanism according to this invention provides the means for performing these functions in that it permits accurate snubbing of the fluid motor regardless of variations in either the inlet or the exhaust pressures of the motor system. It should be understood that the mechanism according to this invention will operate satisfactorily if the fluid motor is powered by any gas under pressure. However, for purposes of simplicity, the description will generally refer to pneumatic or air operation.

Referring to the drawing, a cylinder 10 is provided with a piston 11 which divides the cylinder into a first chamber 12 and a second chamber 13. When the pressure in the first chamber 12 is greater than the pressure in the second chamber 13, the piston 11 is moved to the right, and if the opposite pressure relationship exists, the piston 11 moves to the left. A piston rod 14 is mounted on the piston 11 and is provided with a mounting portion 16 which co-operates with a mounting portion 17 on the cylinder 10 to permit the connection of the fluid motor to a load. Those skilled in the art will realize that such a piston and cylinder structure is considered a positive displacement motor. However, there are other types such as gear motors to which the present invention is applicable. Therefore, the piston and cylinder fluid motor shown is merely illustrative of one of the more common types of positive displacement fluid motors.

An operating valve 18 is connected to the two chambers 12 and 13 by separate pressure lines 19 and 21 respectively. The operating valve 18 also connects to a source of air pressure (not shown) by a pressure line 22 and to a cut off valve 23 by a pressure line 24. The cut off valve 23 is in turn connected to an exhaust regulator 26 which is connected to the pressure in the line 22 by a fluid conduit 27. The operating valve 18 can be rotated to connect the various elements as shown wherein the first chamber 12 is connected to the exhaust regulator 26 and the second chamber 13 is connected to the source of air pressure through the pressure lines 21 and 22. To reverse the operation, the valve 18 can be operated to a position wherein the connection will reverse and the second chamber 13 is connected to the exhaust regulator 26 and the first chamber 12 is connected to the source of air pressure through the line 22.

For purposes of illustration, it should now be assumed that when the piston is moving to the left it is desired to bring the piston to rest as soon as it reaches the position shown in Figure 1. It is also desired to have the cut off valve which initiates the snubbing action operated when the piston 11 is in a predetermined position represented by the phantom position shown in Figure 1. These two conditions are to be met even though the inlet pressure can vary over a wide range of pressures. Again, for purposes of illustration, an assumption is made that the piston 11 will come to rest in the position shown if the pressure in the chamber 12 is equal to the pressure in the chamber 13 when the piston reaches that position. If the piston were to start moving to the left from the right hand extreme position under the influence of an inlet pressure and the exhaust pressure were allowed to assume a value essentially constant, such as atmospheric pressure, it would be necessary to have a different cut off position for each inlet pressure if the snubbed position were to be fixed. Therefore, if the inlet pressure varies, the cut off point will have to vary unless the exhaust pressure in the chamber 12 is maintained in a predetermined relationship to the inlet pressure in the chamber 13. When gases are compressed, they follow the formula $P_1V_1^n = P_2V_2^n$. Where $P_1$ and $P_2$ are the absolute pressures of the gas within the chamber 12 in the cut off point and at the snub point respectively and $V_1$ and $V_2$ are equal to the effective volume of the chamber 12 at the cut off point and snubbed point respectively. The symbol $(n)$ is a constant determined by the type of compression of the gas in the chamber 12 and the gas properties. The effective volume of the chamber 12 includes the entire volume of air within the chamber 12 at these two positions as well as the volume of air within the pressure lines 19 and 24 ahead of the cut off valve 23. Since the snubbed or rest position of the piston 11 is predetermined by the design, and it is assumed that the pressure within the pressure chamber 12 should equal the pressure within the chamber 13 at this time the volume $V_1$ can be determined. If air is used in the cylinder and the compression is adiabatic the value of $(n)$ is 1.4. The regulated exhaust pressure also should be less than the inlet pressure by an amount which will give a sufficient force reaction to move the design load when the pressure source is at the minimum design pressure. Since it is assumed that $P_2$ should equal the inlet pressure and $P_1$ is less than the inlet pressure by a predetermined amount i.e. that amount necessary to move the load under minimum pressure conditions, $P_1$, $P_2$, and $V_2$ are known and $V_1$ can be determined from the equation $$V_1^n = \frac{P_2 V_2^n}{P_1}$$

Therefore, the cut off point wherein the exhaust should be closed can be determined as that point wherein the effective volume of the chamber 12 is equal to the determined value $V_1$.

The cut off valve 23 should be a normally open electrically closed valve operated by a solenoid 28. The solenoid 28 is connected to a micro switch 29 in such a manner that the cut off valve 23 is closed when the micro switch is operated by an operator 31 mounted on the piston rod 14. The various elements are proportioned so that the micro switch is operated when the piston 11 reaches the phantom or cut off position of Figure 1.

Now that the cut off point is determined and the snubbed or rest position is determined, it is merely necessary to regulate the pressure $P_1$ within the chamber 12 so that there will be sufficient air pressure within the chamber at the point of cut off to be compressed to a pressure equal to the inlet pressure when the snubbed or static position is reached. To provide this relationship I utilize the exhaust regulator 26 which is constructed so that the pressure in the chamber 12 is always maintained in a relationship to the pressure of the source so that $P_1$ is equal to the inlet pressure times $$\frac{V_2^n}{V_1^n}$$

If this relationship between the pressure in the chamber 12 and the pressure in the chamber 13 is maintained wherein the ratio of the pressures in the two chambers is equal to a constant determined by the two volumes and the value of $(n)$ the proper amount of air will always be provided within the chamber 12 at the cut off point to provide proper snubbing.

Reference should now be made to Figure 2 wherein the structure of the exhaust regulator 26 is shown. The exhaust regulator 26 comprises a cylinder body 32 closed at its upper end by a bulkhead 33 and at its lower end by a fitting 34 which is connected to the cut off valve 23 by a pressure line 36. A pressure responsive floating piston 37 is slidable within the body 32 and divides the body into a reference chamber 38 and a control chamber 39. The reference chamber 38 is connected to the source of pressure fluid by the conduit 27 so that it is always maintained at the pressure of the source. The control chamber 39 is connected to the valve 23 through a pressure line 36 and ports 41, so that there is fluid communication with the cut off valve at all times. A spring 42 extends between the piston 37 and the fitting 34 urging the piston upward against an adjusting stop screw 43 which is threaded through the bulkhead 33. A lock nut 44 is provided to securely lock the stop screw 43 in any adjusting position. A guide rod 46 is formed with a threaded stem 47 on which a nut 48 is threaded to secure the guide rod 46 to the piston 37. The lower end of the guide rod 46 is formed with a portion 49 of reduced diameter which extends through a guide bore 51 formed in the fitting 34 and a shoulder 52 which is engageable with the fitting 34 to limit the downward movement of the piston 37.

The body 32 is formed with exhaust ports 53 which a skirt 54 on the piston 37 partially closes progressively as the piston 37 moves downwardly along the body 32. The downward forces acting on the piston 37 are a result of a pressure within the chamber 38 and the upward forces are a result of the spring 42 and the pressure within the chamber 39. The spring 42 should be sized so that it will maintain the piston 37 in its upper extreme position until the pressure within the chamber 29 drops below the pressure within the chamber 38 by an amount equal to the minimum pressure differential required to operate the piston 11. If the pressure in the chamber 39 drops below the pressure in the chamber 38 by an amount greater than this minimum differential, sufficient force is developed in the chamber 38 to overcome the spring 42 and move the piston downwardly partially closing off the exhaust ports 53. This causes the pressure in the chamber 39 to increase, and the piston 37 to find an equilibrium position for a given flow of air through the exhaust ports 53, thereby maintaining the pressure in the controlled chamber 39 at its proper relationship to the pressure in the reference chamber 38.

If the inlet pressure is increased above the minimum pressure the regulated pressure in the chamber 39 will increase and a greater pressure drop will take place across the exhaust ports 53 so that a given size exhaust opening will pass greater quantity of air. This will cause the pressure in the controlled chamber 39 to drop which in turn causes the piston 37 to move downwardly to a new equilibrium position. Since the spring 42 must be compressed more for the new equilibrium position, a larger force will be exerted by the spring 42 so the pressure differential between the control chamber 38 will increase. If the spring 42 is properly calibrated and the exhaust openings 53 properly sized for the particular installation the pressure in the control chamber 39 will always be maintained in a relationship to the pressure in the reference chamber 38 so that the pressure in the controlled chamber is equal to the pressure in the reference chamber 38 times $$\frac{V_2^n}{V_1^n}$$

Since the control chamber 39 determines the pressure of the chamber 12 and the reference chamber 38 is always maintained equal to the pressure of the chamber 13, the proper quantities of air will be provided in the chamber 12 for proper snubbing. Of course, once the cut off valve 23 is closed, the regulator 26 does not function to regulate the exhaust and the air in the chamber 12 is compressed by continued piston movement to provide the snubbing.

In Figure 3, a typical velocity stroke diagram is shown wherein three curves illustrate the velocity relationship which will be achieved for three different inlet pressures. The bottom curve would be an illustration of the operation when the inlet pressure was at a minimum. The top curve illustrates the velocity if the inlet pressure is at a maximum and the middle curves illustrate the operation when the inlet pressure is at some intermediate value. It should be noted that though the velocity during the stroke prior to the cut off is different for different pressures, the velocity will reach zero in the same point in the stroke regardless of the inlet pressure.

In operation when the piston 11 is in its right hand position adjacent to the right end of the cylinder 10 fluid under pressure is supplied through the pressure lines 22 and 21 to the chamber 13. At this time the chamber 12 is connected to the exhaust regulator 26 through the valve 18 and the open cut-off valve 23. When the pressure in the chamber 13 exceeds the pressure in the chamber 12 by an amount sufficient to overcome the load the piston 11 commences to move to the left. The exhaust regulator 26 operates to maintain a pre-determined relationship between the pressures in the chamber 13 and the chamber 12 so that the pressure in the chamber 12 is equal to the pressure in the chamber 13 times $$\frac{V_2^n}{V_1^n}$$

When the operator 31 engages the micro-switch 29 the cut-off valve 23 is closed, preventing further exhaust from the chamber 12 so that additional movement of the piston 11 to the left beyond the cut-off point compresses the gas contained therein to bring the piston 11 to rest at the desired snubbed point, at which time the pressures in the two chambers 12 and 13 will be equal. The above action will take place regardless of the inlet pressure because the exhaust regulator maintains sufficient pressure within the chamber 12 to provide proper snubbing for any inlet pressure.

If it is desired to merely snub the piston 11 down to a predetermined velocity and then have the piston moved to the extreme position at a slow rate, it is merely necessary to provide a small bleed in the system. This can be provided in the cut off valve so that even though a valve is closed some air will leak out through the exhaust regulator 26. If this is done, the skirt portion 54 should be arranged so that it does not completely close the exhaust ports 53 when it is in the fully operated position. It should be noted that in this description, the term velocity should include zero velocity so as to be generic to the situation wherein the actuator is snubbed to a predetermined positive velocity or to a predetermined zero velocity. If the mechanism is such that it requires a greater pressure within the chamber 12 than the pressure within the chamber 13 at the snubbed position, it is merely necessary to relocate the cut off point and once this new location is found, the same relationship between the pressures will be maintained at the snubbed position.

Although a preferred embodiment of this invention is illustrated, it will be realized that various modifications of the structural details may be made without departing from the mode of the operation and the essence of the invention. Therefore, except insofar as they are claimed in the appended claims, structural details may be varied widely without modifying the mode of operation. Accordingly, the appended claims, and not the aforesaid detailed description are determinative of the scope of the invention.

I claim:

1. A control mechanism for snubbing a positive displacement pneumatic motor having an inlet and exhaust comprising a cut off valve and an exhaust regulator through which the exhaust from said motor passes, means referencing said regulator to the pressure of said inlet, means operated by the movement of said motor to a predetermined cut off point closing said cut off valve, said regulator maintaining the ratio of the inlet to the exhaust pressure of said motor so that it is equal to the ratio of the effective volume of the exhaust portion of said motor at the cut off point to the effective volume of the exhaust portion at a predetermined snubbed position, the ratio of volumes being taken to a constant exponent determined by the adiabatic compression of air.

2. In a device of the character described a positive displacement fluid motor having an inlet and an exhaust, gas under pressure connected to said inlet, an exhaust regulator including a housing having a bore, a piston slidable in said bore dividing said housing into a reference chamber and a regulating chamber, conduit means connecting said inlet and reference chamber, valved means connecting said exhaust and said regulator chamber, ports in said housing open to said regulating chamber through which exhaust gases flow at a rate determined by the position of said piston, a spring engaging said piston urging in a direction toward said reference chamber, the shape of said ports being related to the size of said spring so that the absolute pressure in said regulating chamber divided by the absolute pressure in said reference chamber is equal to a constant, said valved means operating to close said exhaust when said motor reaches a predetermined point in its movement.

References Cited in the file of this patent

UNITED STATES PATENTS

| 610,479 | Ewart | Sept. 6, 1898 |
| 1,544,751 | Haynes et al. | July 7, 1925 |
| 1,748,496 | Rowntree | Feb. 25, 1930 |
| 2,458,290 | Monroe | Jan. 4, 1949 |
| 2,750,929 | Bronson | June 19, 1956 |

FOREIGN PATENTS

| 121,504 | Sweden | Apr. 20, 1948 |